US012631830B2

(12) United States Patent
Ando et al.

(10) Patent No.: US 12,631,830 B2
(45) Date of Patent: May 19, 2026

(54) OPTICAL CONNECTOR FERRULE

(71) Applicant: FURUKAWA ELECTRIC CO., LTD.,
Tokyo (JP)

(72) Inventors: Takayuki Ando, Tokyo (JP);
Masayoshi Tsukamoto, Tokyo (JP)

(73) Assignee: FURUKAWA ELECTRIC CO., LTD.,
Tokyo (JP)

( * ) Notice: Subject to any disclaimer, the term of this
patent is extended or adjusted under 35
U.S.C. 154(b) by 253 days.

(21) Appl. No.: 18/516,599

(22) Filed: Nov. 21, 2023

(65) Prior Publication Data

US 2024/0085639 A1     Mar. 14, 2024

Related U.S. Application Data

(63) Continuation     of     application     No.
PCT/JP2022/024330, filed on Jun. 17, 2022.

(30) Foreign Application Priority Data

Jun. 22, 2021     (JP) ................................. 2021-103655

(51) Int. Cl.
*G02B 6/38*     (2006.01)
(52) U.S. Cl.
CPC .................................. *G02B 6/3861* (2013.01)
(58) Field of Classification Search
CPC ... G02B 6/3839; G02B 6/3885; G02B 6/3807
See application file for complete search history.

(56) References Cited

U.S. PATENT DOCUMENTS

| | | | | | |
|---|---|---|---|---|---|
| 5,923,803 | A | * | 7/1999 | Bunin .................. | G02B 6/3861 |
| | | | | | 385/80 |
| 9,086,547 | B2 | * | 7/2015 | McColloch .......... | G02B 6/3839 |
| 10,585,248 | B2 | | 3/2020 | Childers et al. | |

(Continued)

FOREIGN PATENT DOCUMENTS

| | | |
|---|---|---|
| JP | 02-146508 A | 6/1990 |
| JP | 09-054225 A | 2/1997 |

(Continued)

OTHER PUBLICATIONS

International Search Report, corresponding International Application No. PCT/JP2022/024330, mailing date Aug. 16, 2022.

(Continued)

*Primary Examiner* — Eric Wong
(74) *Attorney, Agent, or Firm* — MARSHALL,
GERSTEIN & BORUN LLP

(57)     ABSTRACT

An optical connector ferrule is a member in which an optical fiber is fixed inside a body section, and the distal-end side thereof forms a connection end surface for the optical fiber. An internal space in which the optical fiber is accommodated is formed inside the body section. The internal space runs through from the rear end to the distal end of the body section. An adhesive injection window that is open to the outside is formed in the upper surface of the body section. The adhesive injection window and the internal space are communicated inside the body section via a reduced-diameter section. In plan view, the area (area of the smallest section) of the reduced-diameter section is smaller than the open area of the adhesive injection window.

8 Claims, 4 Drawing Sheets

(56) References Cited

U.S. PATENT DOCUMENTS

| | | | | |
|---|---|---|---|---|
| 2001/0053266 A1* | 12/2001 | Suematsu | ............ | G02B 6/3839 |
| | | | | 385/80 |
| 2002/0168150 A1* | 11/2002 | Shiino | .................. | G02B 6/3865 |
| | | | | 385/71 |
| 2007/0098328 A1* | 5/2007 | Dean | .................... | G02B 6/3839 |
| | | | | 385/71 |
| 2015/0226922 A1 | 8/2015 | Childers | | |
| 2020/0120979 A1* | 4/2020 | Arnett | .................... | A24F 40/40 |
| 2020/0142133 A1* | 5/2020 | Iizumi | .................. | G02B 6/3885 |

FOREIGN PATENT DOCUMENTS

| | | | |
|---|---|---|---|
| JP | 2001-330758 A | 11/2001 |
| JP | 2002-328264 A | 11/2002 |
| JP | 2004-4333 A | 1/2004 |
| JP | 2004-20962 A | 1/2004 |
| JP | 2004-317737 A | 11/2004 |
| JP | 2020-76957 A | 5/2020 |
| WO | WO-2018055930 A1 | 3/2018 |
| WO | WO-2021/111773 A1 | 6/2021 |

OTHER PUBLICATIONS

Office Action, Japanese patent application No. 2021-103655, drafting date Mar. 22, 2022.
Office Action, Japanese patent application No. 2021-103655, drafting date Jun. 17, 2022.

* cited by examiner

OPTICAL CONNECTOR FERRULE

TECHNICAL FIELD

The present invention relates to an optical connector ferrule in which an optical fiber is to be fixed inside.

BACKGROUND

To connect optical fibers with each other, various types of optical connectors and connector ferrules have been proposed. An optical fiber is fixed with adhesive inside a ferrule. Thus, a part of the ferrule is formed with a window for injecting the adhesive to the inside, and, with the optical fiber being disposed inside the ferrule, the adhesive is injected from the injection window so that the optical fiber is fixed to the ferrule (Japanese Unexamined Patent Application Publication No. H2-146508 (JP-A-H2-146508) and Japanese Unexamined Patent Application Publication No. 2002-328264 (JP-A-2002-328264), for example).

A space that is to be filled with adhesive and has a certain size is formed inside a ferrule. Also, an adhesive injection window is to have a certain size to inject the adhesive into the space inside the ferrule. However, such the large space and an opening section may lower strength of the ferrule. Especially for a downsized connector, a volume ratio of the space therein is relatively high, which greatly affects and reduces its strength.

Also, the space inside the ferrule is open to the outside through the above-mentioned adhesive injection window and a boot/ribbon-fiber insertion section, and thus the adhesive filled in the space in the ferrule experiences deformation and volume fluctuation, such as expansion and contraction, due to temperature change and moisture absorption or desiccation. For this reason, stress or distortion due to the deformation or volume fluctuation of the adhesive may be applied onto the optical fiber that is fixed in the space inside, and, eventually, this may cause breaking of the optical fiber or position change (optical loss) of the optical fiber at a connection end surface.

Alternatively, a method using a smaller amount of adhesive injection without providing the adhesive injection window may be used. However, in such the method, it is difficult to accurately fill the adhesive into the ferrule while preventing air inclusion and leaking of the adhesive at the same time.

In addition, with the adhesive injection window, anchor effect by the adhesive filled into the injection window can be expected when tensile force is applied to the optical fiber. On the other hand, with a shape without adhesive injection window but with only an insertion section of the optical fiber and a front-end section as openings (i.e., openings only in an axial direction of the optical fiber), the anchor effect cannot be expected and pullout strength of the optical fiber may be lowered.

The present invention was made in view of such problems. It is an object of the present invention to provide an optical connector ferrule that has an excellent adhesive filling property and in which deformation and volume fluctuation of the adhesive have less influence.

SUMMARY OF THE DISCLOSURE

To achieve the above object, the present invention is an optical connector ferrule in which an optical fiber is fixed inside a body section and of which a front-end side is a connection end surface. The optical connector ferrule includes an internal space, which accommodates the optical fiber, and an adhesive injection window, which is open to an outside. The internal space communicates with the adhesive injection window via a reduced-diameter section. An area of the reduced-diameter section is smaller than an open area of the adhesive injection window.

A sloped surface may be formed toward a rear-end side of the body section between an opening section of the adhesive injection window and the reduced-diameter section. In such the case, it is preferable that a slope angle of the sloped surface, which is formed toward the rear-end side of the body section on the front-end side of the body section, with respect to a front-rear end direction of the body section is less than 45°. Also, in the adhesive injection window, the slope angle at the front-end side of the body section with respect to the front-rear end direction of the body section may be less than a slope angle at the rear-end side of the body section with respect to the front-rear end direction of the body section, and a width of the reduced-diameter section may be less than a width of the adhesive injection window. Also, a minimum area of the reduced-diameter section is preferably a half of or less than a half of the open area of the adhesive injection window.

A dent section may be formed on an outer surface of the body section. The outer surface is on a side that is opposite to a side in which the adhesive injection window is formed. In such the case, it is preferable that a reduced volume of the dent section is substantially equivalent to a volume of a space between the adhesive injection window and the reduced-diameter section.

The connection end surface may be formed of any of a plane surface that is substantially perpendicular to a connection direction, a plane surface that is sloped with respect to the connection direction, and a curved surface curved toward the connection direction.

The body section may be formed of PPS resin including filling material.

A length of the body section in the connection direction may be 5 mm or less. Also, a boot may be disposed at a section for inserting the optical fiber into the body section, and the internal space may include a boot accommodating section for accommodating the boot and a reduced-diameter step section against which an end face of the boot is butted. When the boot is inserted into the body section, the boot may come into contact with the reduced-diameter step section and a rear of the internal space may be substantially blocked.

According to the present invention, the reduced-diameter section is formed between the adhesive injection window and the internal space. This can prevent influences of deformation or volume fluctuation of the adhesive within a space between the adhesive injection window and the reduced-diameter section from being transmitted to the internal space. Also, using the adhesive injection window facilitates injection of the adhesive into the internal space. In addition, the reduced-diameter section functions as a reinforcement structure for the ferrule.

Also, by forming the sloped surface between the opening section of the adhesive injection window and the reduced-diameter section toward the rear-end side of the body section, the adhesive injected from the adhesive injection window can flow toward a rear side of the body section. Thus, the adhesive fills the internal space in order from the rear-end side, which can prevent air accumulation and the like in the internal space.

Also, the dent section is formed on the outer surface of the body section, which is opposite to the side in which the adhesive injection window is formed. This can prevent imbalance of amounts of resin on upper and lower sides at the time of injection molding, equalizing the resin flows at the time of injection molding. As a result, the body section can be molded with a high dimensional accuracy.

Also, the connection end surface is formed of any of a plane surface that is substantially perpendicular to a connection direction, a plane surface that is sloped with respect to the connection direction, and a curved surface curved toward the connection direction. This can make certain that the tip ends of the optical fibers are in contact with each other at the time of connector connection.

Also, by forming the body section of PPS resin containing inorganic fibers or filler material, higher strength and dimensional accuracy can be obtained.

Also, by making the length of the body section in the connection direction 5 mm or less, the connector ferrule can be downsized compared to conventionally known connector ferrules.

The present invention can provide an optical connector ferrule that has an excellent adhesive filling property and in which deformation and volume fluctuation of the adhesive have less influence.

DETAILED DESCRIPTION

Figure 1:
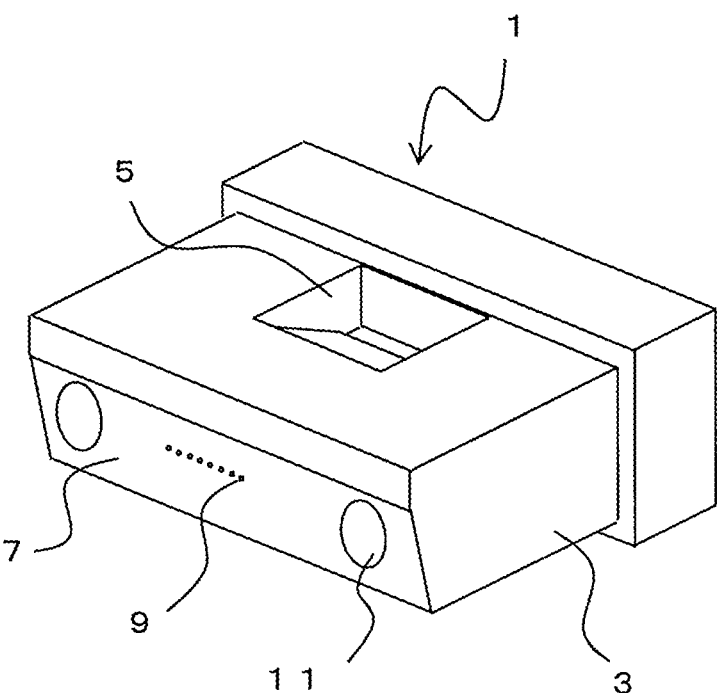
FIG. 1A is a perspective view showing an optical connector ferrule 1.
FIG. 1B is a cross-sectional view of the optical connector ferrule 1 taken along an axial direction thereof.
Figure 1:
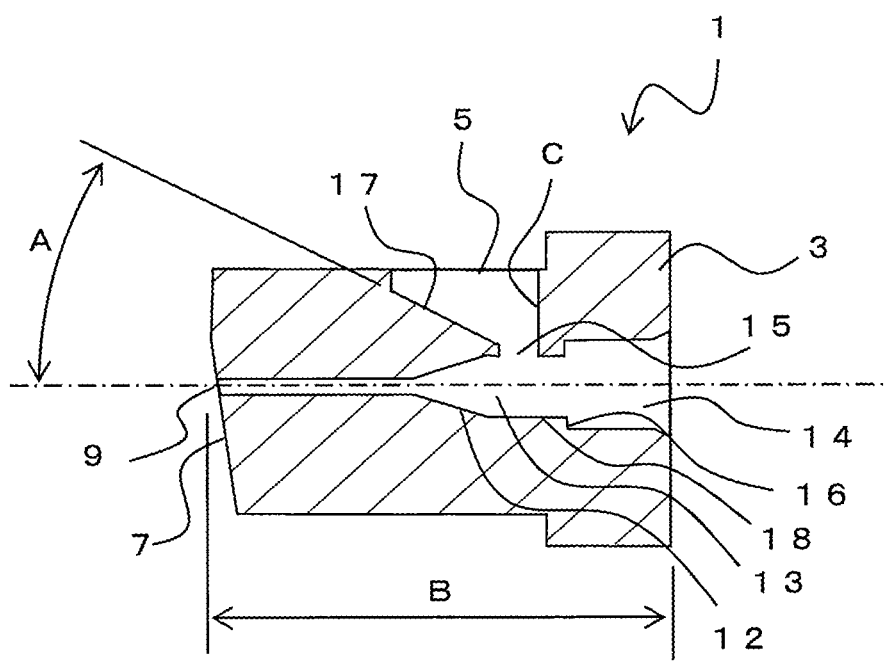

Hereinafter, an optical connector ferrule according to embodiments of the present invention will be described with reference to the accompanying drawings. FIG. 1A is a perspective view showing an optical connector ferrule 1, and FIG. 1B is a cross-sectional view thereof. The optical connector ferrule 1 is a member in which an optical fiber is fixed inside a body section 3, with a front-end side as a connection end surface 7. The optical connector ferrule 1 can be used as a so-called Mechanically Transferable Connector (MT connector) having a guide mechanism, for example.

An internal space 13 for accommodating the optical fiber is formed inside the body section 3. The internal space 13 runs through from a rear end to a front end of the body section 3. Here, a side of the body section 3 into which the optical fiber is to be inserted (the right side in FIG. 1B) will be referred to as a rear-end side, and a side at which an end face of the optical fiber is to be exposed (the left side in FIG. 1B) will be referred to as the front-end side. That is, a left-right direction in FIG. 1B will be referred to as a front-rear end direction (alternatively, in some cases, a connection direction) of the body section 3.

A length of the body section 3 in the connection direction (B in FIG. 1B) is shorter than a length of a common MT connector ferrule (approximately 8 mm) and may be 5 mm or less. The present embodiment is particularly effective for the further small-sized body section 3. The body section 3 is molded by injection molding, for example, and is formed of polyphenylene sulfide (PPS) resin that includes filling material such as inorganic fibers or filler.

The internal space 13 communicates with the front-end side of the body section 3, becoming a hole 9 into which the optical fiber is inserted through. The present embodiment shows a multiple-core connector ferrule in which a plurality of optical fibers are provided side by side to be fixed. That is, the plurality of holes 9 are provided side by side on the connection end surface 7.

The connection end surface 7 is a plane surface that is sloped with respect to the connection direction. That is, the plurality of holes 9 are arranged on a sloped surface. Also, a pair of guide holes 11 are provided on both sides of the holes 9. Guide pins or the like are inserted into the guide holes 11.

An adhesive injection window 5 that is open to the outside is formed in an upper surface of the body section 3. As shown in FIG. 1B, the adhesive injection window 5 communicates with the internal space 13 inside the body section 3 via a reduced-diameter section 15. In plan view, an area of the reduced-diameter section 15 (a minimum area) is smaller than an open area of the adhesive injection window 5.

In the illustrated example, in the front-rear end direction of the body section 3 (left-right direction in the drawing), a length of the reduced-diameter section 15 is set to be shorter than a length of the adhesive injection window 5. Note that, in a width direction of the body section 3 (a direction perpendicular to the paper surface in FIG. 1B), a width of the reduced-diameter section 15 and a width of the adhesive injection window 5 may be substantially the same, or the width of the reduced-diameter section 15 may be made shorter than an opening width of the adhesive injection window 5 by forming a slope surface.

A sloped surface 17 is formed toward the rear-end side of the body section 3 between an opening section of the adhesive injection window 5 and the reduced-diameter section 15. On the other hand, an inner side surface between the opening section of the adhesive injection window 5 and the reduced-diameter section 15 on the rear-end side (C in the drawing) may be substantially perpendicular to the front-rear end direction of the body section 3, or may be slightly sloped toward the front-end side. However, it is preferable that a slope angle of the sloped surface 17 on the front-end side of the body section 3 with respect to the front-rear end direction of the body section 3 (A in the drawing) is less than a slope angle of the side surface C on the rear-end side of the body section 3 with respect to the front-rear end direction of the body section 3 (an angle to the front-rear end direction of the body section 3)

It is preferable that the slope angle of the sloped surface 17 on the front-end side of the body section 3 is less than 45°. The angle of 45° or more reduces a difference between the open area of the adhesive injection window 5 and the area of the reduced-diameter section 15, lowering the effect of the present invention. Also, it is preferable that, in the plan view, the area of the reduced-diameter section 15 (the minimum area) is a half of or less than a half of the open area of the adhesive injection window 5 (a maximum area).

Figure 2:
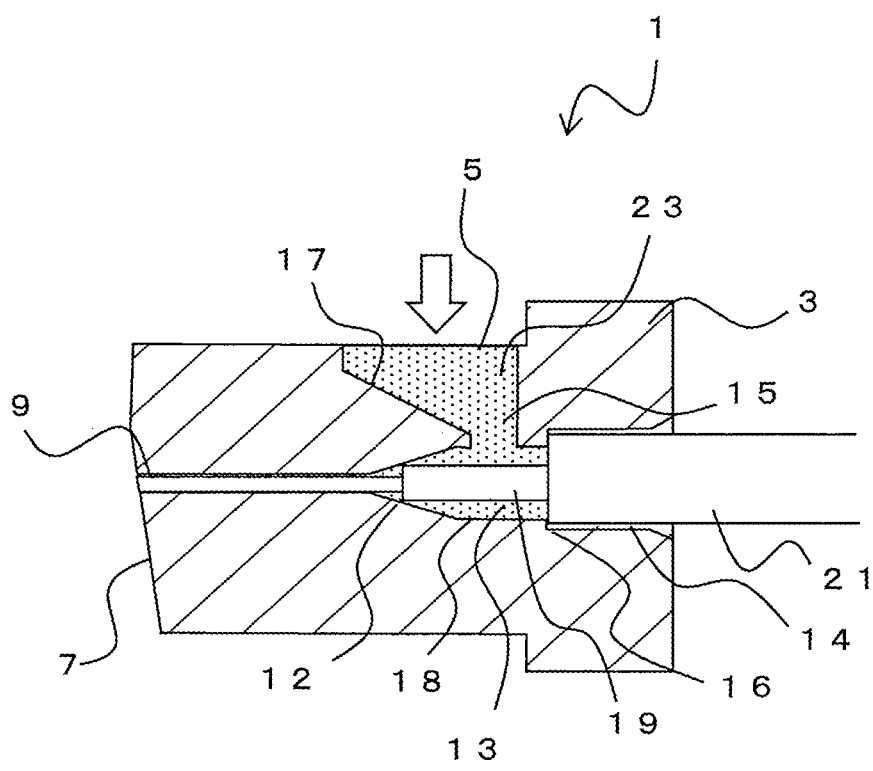
FIG. 2 is a cross-sectional view showing a state in which an optical fiber 19 is fixed to the optical connector ferrule 1.

Next, a fixing structure in which the optical fiber is fixed to the optical connector ferrule 1 will be described. FIG. 2 is a cross-sectional view showing a structure in which an optical fiber 19 is fixed to the optical connector ferrule 1 by using an adhesive 23. The optical fiber 19 is inserted from the rear-end side of the body section 3.

The optical fiber 19 includes an inner optical bare fiber made of glass and a resin layer that is formed around the optical bare fiber. Also, a boot 21 made of rubber, for example, is disposed at a section of the optical connector ferrule 1 (the body section 3) into which the optical fiber 19 is inserted. The optical fiber 19 is inserted through into the boot 21. The resin layer in proximity of a tip end of the optical fiber 19 is removed to expose the inner optical bare fiber, which is then inserted through into the hole 9. The hole 9 is smaller than an outer diameter of the resin layer, and thus an end face of the resin layer is butted against a tapered section of the hole 9 on the rear-end side so that a position of the optical fiber 19 can be determined.

The internal space 13 functions as a guide when inserting the optical fiber 19 etc. in order from the rear-end side of the body section 3. The internal space 13 includes, in order from the rear-end side of the body section 3, a tapered section of which a diameter decreases toward the front-end side, a boot accommodating section 14 for accommodating the boot 21, a reduced-diameter step section 16 at which the end face of the boot 21 is butted and positioned, a tapered section 12 at which the above-mentioned resin layer is butted so as to function as an insertion guide for the optical bare fiber and of which a diameter decreases toward the front-end side, and a hole 9 that is formed with substantially the same diameter through to the front end. That is, the hole 9 has a substantially uniform inner diameter with respect to an insertion direction of the optical fiber 19, and the internal space 13 has a tapered shape of which an inner diameter gradually decreases up to the hole 9. In more detail, with respect to a reduced diameter (height) at the reduced-diameter step section 16, the internal space 13 includes a uniform-diameter section 18 formed toward the front-end side of the body section 3 with a predetermined length and a uniform diameter (height). The tapered section 12 gradually decreases the diameter (height) so that a front-end side of the uniform-diameter section 18 connects smoothly to the hole 9. The reduced-diameter section 15 is connected to the uniform-diameter section 18 of the internal space 13. That is, the tapered section 12 starts reducing the diameter from the farther front-end side than the reduced-diameter section 15, and the reduced-diameter step section 16 is located farther rear of the reduced-diameter section 15. At this time, no step difference in which the diameter rapidly changes is formed between a communicating section of the internal space 13 with the reduced-diameter section 15 and the hole 9. Also, the boot accommodating section 14 is larger than a size (height) of the boot 21 and the reduced-diameter step section 16 is smaller than the size (height) of the boot 21. Thus, when the optical fiber 19 and the boot 21 are inserted into the body section 3, the boot 21 is disposed in the boot accommodating section 14 at the rear of the internal space 13 (the reduced-diameter section 15), and a tip end of the boot 21 comes into contact with the reduced-diameter step section 16, which substantially blocks the rear end of the internal space 13.

When the adhesive 23 is injected from the adhesive injection window 5 in this state, the adhesive 23 is injected into the internal space 13 via the reduced-diameter section 15. At this time, the adhesive injection window 5 has the sufficiently large open area, which facilitates injection of the adhesive. Also, the adhesive 23 can be pooled in a space between the opening section of the adhesive injection window 5 and the reduced-diameter section 15, and this downward pressure of the pooled adhesive 23 can make sure that the adhesive 23 is injected into the internal space 13.

As mentioned above, the sloped surface 17 is formed toward the rear between the adhesive injection window 5 and the reduced-diameter section 15. Thus, the adhesive 23 flows preferentially toward the rear of the internal space 13 via the reduced-diameter section 15. Thus, the adhesive 23 fills the internal space 13 in order from the rear, and the injected adhesive 23 in the internal space 13 flows from the rear to the front. Also, when the adhesive 23 flowing from the reduced-diameter section 15 into the internal space 13 flows toward the front, the diameter of the internal space 13 decreases gradually toward the front with no level difference and thus the adhesive 23 can smoothly flow to the front. This can prevent air accumulation and the like from being formed.

As mentioned above, the end face of the boot 21 is butted against the reduced-diameter step section 16 at the rear of the internal space 13, which is then blocked, and thus not a lot of the adhesive 23 flows out of the rear of the body section 3. However, a little amount of the adhesive 23 may leak out into a gap between an outer periphery surface of the boot 21 and the body section 3. Similarly, the adhesive 23 may leak out of a gap between the resin layer of the optical fiber 19 and the body section 3 into the hole 9.

The adhesive 23 is then cured in this state so that the optical fiber 19 can be fixed to the body section 3. After fixing the optical fiber 19, the connection end surface 7 and the optical fiber 19 are polished together. That is, an end face position of the optical fiber 19 substantially coincides with the connection end surface 7. For the adhesive 23, thermosetting resin, a UV curable resin, or any other non-limiting types of resin are applicable.

Here, the adhesive 23 is cured inside the internal space 13 as well as at an upper part of the reduced-diameter section 15. Thus, anchor effect of the adhesive 23 can provide pullout force for the optical fiber 19 with certainty.

Also, the reduced-diameter section 15 improves strength of the body section 3. For example, particularly for a small-sized connector ferrule, a ratio of a volume of the internal space 13 and the like into which the adhesive 23 is filled is relatively large, which may lower the strength. In contrast, the reduced-diameter section 15 functions as a reinforcement section that prevents deformation of the body section 3.

Also, the adhesive 23 deforms or expands/contracts (volume fluctuation) due to temperature change and/or absorption of moisture or desiccation at the time of curing and/or after the curing. Such deformation or volume fluctuation may add stress to the optical fiber 19 and may increase transmission loss. For example, as in a conventional connector ferrule, when the adhesive is filled into the internal space from the adhesive injection window without the reduced-diameter section and cured, the deformation and volume fluctuation of the adhesive, if any, may affect the optical fiber.

In contrast, with the reduced-diameter section 15 being provided, the reduced-diameter section 15 cuts off the influences of deformation or volume fluctuation of the adhesive 23 that is filled above the reduced-diameter section 15, for example. This can prevent the optical fiber 19 from being affected at least by the adhesive 23 in a part above the reduced-diameter section 15. Thus, stress applied onto the optical fiber 19 and a position change of the end faces of the optical fiber 19 at the connection end surface 7 can be suppressed. At this time, an upper surface side of the reduced-diameter section 15 has the sloped surface 17 formed whereas a lower surface side thereof corresponds to the uniform-diameter section 18 of the internal space 13. For this reason, the reduced-diameter section 15 has a predetermined thickness on a cross-section, not being excessively sharp toward the rear, and this can provide strength to tip ends of the reduced-diameter section 15.

As above, according to the present embodiment, in the optical connector ferrule 1 having the adhesive injection window 5, the reduced-diameter section 15 is formed between the adhesive injection window 5 and the internal space 13 and this can prevent the optical fiber 19 from being affected by the deformation or volume fluctuation of the adhesive 23. Thus, it is possible to prevent an increase in transmission loss due to stress applied onto the optical fiber 19 or an increase in connection loss due to position change of the tip end of the optical fiber 19.

Also, with the sloped surface 17 being provided from the adhesive injection window 5 toward the reduced-diameter section 15 and from the front-end side toward the rear-end side, the adhesive 23 can flow to the rear-end side of the internal space 13. Thus, the adhesive 23 can flow from the rear toward the front inside the internal space 13. Thus, air accumulation is unlikely to occur and the optical fiber 19 can be bonded and fixed to the body section 3 with certainty.

Also, providing the sloped surface 17 from the adhesive injection window 5 toward the reduced-diameter section 15 and from the front-end side toward the rear-end side of the body section 3 can facilitate removing of the ferrule from a metal mold. This can lower resistance at the time of pulling out the ferrule from the metal mold, and can prevent deformation of the body section 3 especially on the front-end side as well as wearing of the metal mold. At this time, by also providing the sloped surface from the adhesive injection window 5 toward the reduced-diameter section 15 and from the rear-end side toward the front-end side of the body section 3, the pullout resistance from the metal mold can be further reduced. Also in such the case, the adhesive 23 can flow toward the rear-end side in the internal space 13 by making the slope angle on the rear-end side of the body section 3 larger than the slope angle on the front-end side of the body section 3. Also, by forming a slope such that the width of the reduced-diameter section 15 is less than the opening width of the adhesive injection window 5, the adhesive 23 can flow toward a center of the width direction of the internal space 13 and, in the internal space 13, the adhesive 23 can flow outwards from the center of the width direction.

Also, when compared to a case without the reduced-diameter section 15, it is possible to suppress strength reduction of the body section 3 due to the internal space 13. That is, providing the reduced-diameter section 15 can suppress deformation of the body section 3.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

Figure 3:
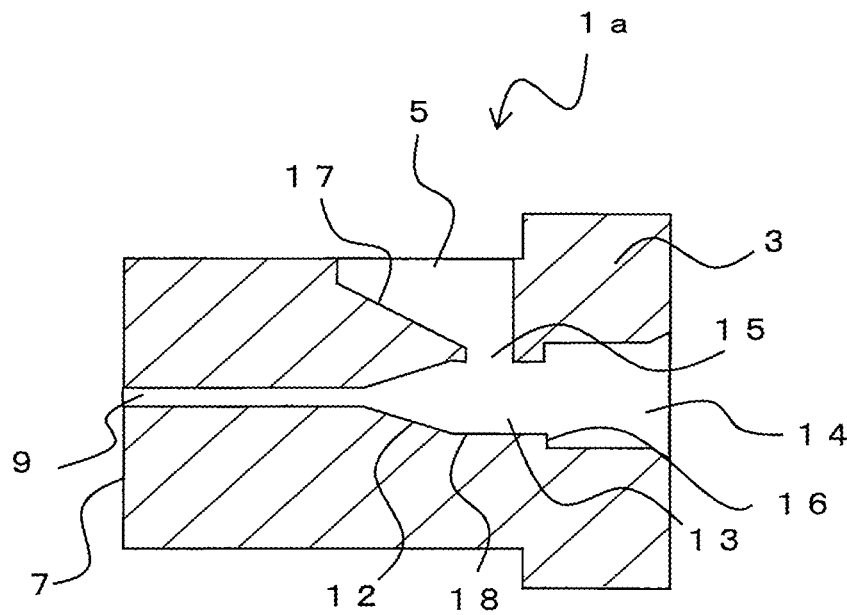
FIG. 3A is a cross-sectional view of an optical connector ferrule 1a taken along an axial direction thereof.
FIG. 3B is a cross-sectional view of an optical connector ferrule 1b taken along an axial direction thereof.
Figure 3:
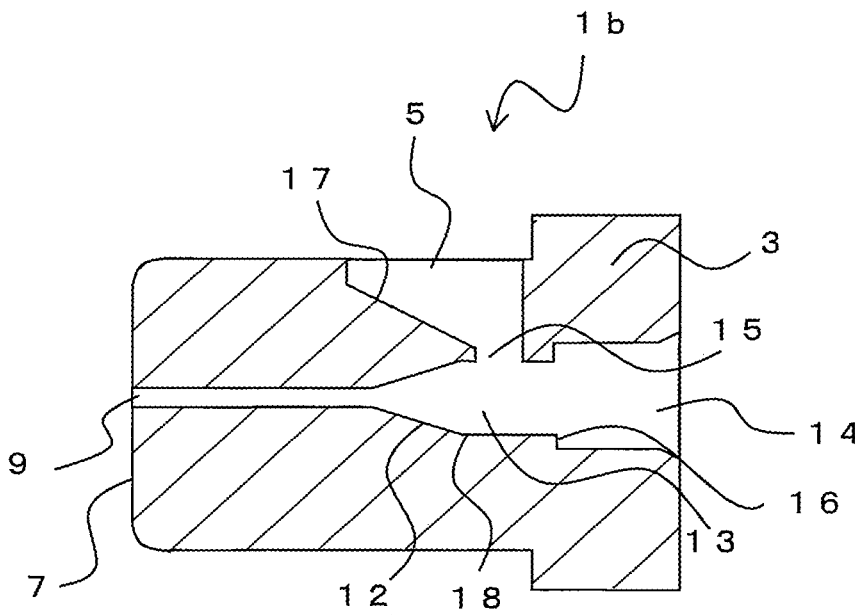

For example, a shape of the body section 3 is not limited to the shape illustrated in FIG. 1B. For example, as shown in FIG. 3A, the connection end surface 7 may be a plane surface that is substantially perpendicular to the connection direction. Alternatively, as shown in FIG. 3B, a part of the connection end surface may be curved toward the connection direction. As above, the connection end surface 7 may be formed of any of the plane surface that is substantially perpendicular to the connection direction, the plane surface that is sloped with respect to the connection direction, and the curved surface curved toward the connection direction.

Figure 4:
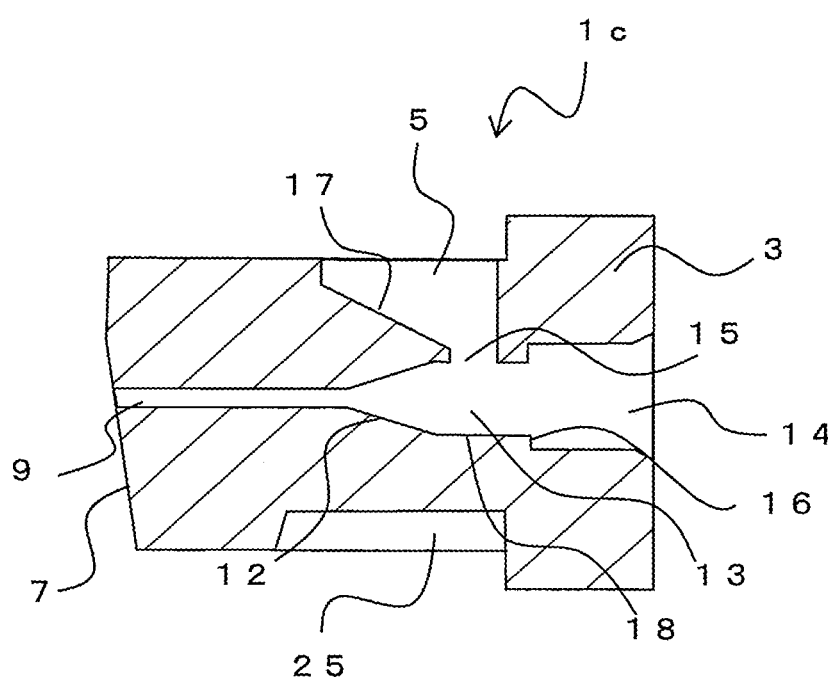
FIG. 4 is a cross-sectional view of an optical connector ferrule 1c taken along an axial direction thereof.

Also, as shown in FIG. 4, a dent section 25 may be formed on an outer surface of the body section 3, which is opposite to a side in which the adhesive injection window 5 is formed (i.e., a lower surface). The dent section 25 is formed to have a predetermined depth with respect to the outer surface, and is not connected to the internal space 13. The dent section 25 is formed such that a reduced volume of the dent section 25 is substantially equivalent to a volume of a space between the adhesive injection window 5 and the reduced-diameter section 15, for example.

As mentioned above, the body section 3 is formed by injection molding. That is, resin is injected from a predetermined position into a cavity of the metal mold, and a shape is molded according to the cavity shape. At this time, the melted resin flows from the injected position into the metal mold to fill the cavity.

If the resin is injected from the rear-end side of the body section 3, for example, since the hole 9 and the internal space 13 are arranged in the substantially middle in a vertical direction of the body section 3, the resin flows toward the front-end side branching off to an upper side and a lower side of the internal space 13. At this time, on the upper side of the internal space 13, the adhesive injection window 5 and the like are formed, which obstructs the flow of the resin. On the other hand, the lower side of the hole 9 is without the adhesive injection window 5, and thus, when compared to the upper side of the hole 9, a fluid resistance of the resin is smaller. Such an imbalance of the resin flow between the upper and lower sides of the hole 9 may deteriorate measurement accuracy of the body section 3.

In contrast, providing the dent section 25 on the outer surface of the opposite side of the adhesive injection window 5 can reduce flow resistance or volume difference of the resin between the upper and lower sides of the internal space 13. Thus, the resin on the upper and lower sides can be well balanced, which can improve the measurement accuracy of the body section 3.

What is claimed is:

1. An optical connector ferrule in which an optical fiber is fixed inside a body section and of which a front-end side is a connection end surface, the optical connector ferrule comprising:

an internal space that accommodates the optical fiber; and an adhesive injection window that is open to an outside, wherein:

the internal space communicates with the adhesive injection window via a reduced-diameter section;

a sloped surface is formed toward a rear-end side of the body section between an opening section of the adhesive injection window and the reduced-diameter section;

a slope angle of the sloped surface, which is formed toward the rear-end side of the body section on the front-end side of the body section, with respect to a front-rear end direction of the body section is less than 45 degrees; and a minimum area of the reduced-diameter section is a half of or less than a half of the open area of the adhesive injection window.

2. The optical connector ferrule according to claim 1, wherein:

in the adhesive injection window, the slope angle at the front-end side of the body section with respect to the front-rear end direction of the body section is less than a slope angle at the rear-end side of the body section with respect to the front-rear end direction of the body section, and a width of the reduced-diameter section is less than a width of the adhesive injection window.

3. The optical connector ferrule according to claim 1, wherein a dent section is formed on an outer surface of the body section, the outer surface being on a side that is opposite to a side in which the adhesive injection window is formed.

4. The optical connector ferrule according to claim 3, wherein a reduced volume of the dent section is substantially equivalent to a volume of a space between the adhesive injection window and the reduced-diameter section.

5. The optical connector ferrule according to claim 1, wherein the connection end surface is formed of any of a plane surface that is substantially perpendicular to a connection direction, a plane surface that is sloped with respect to the connection direction, and a curved surface curved toward the connection direction.

6. The optical connector ferrule according to claim 1, wherein the body section is formed of PPS resin including filling material.

7. The optical connector ferrule according to claim 1, wherein a length of the body section in a connection direction is 5 mm or less.

8. The optical connector ferrule according to claim 1, wherein:

a boot is disposed at a section for inserting the optical fiber into the body section, and the internal space includes a boot accommodating section for accommodating the boot and a reduced-diameter step section against which an end face of the boot is butted so that, when the boot is inserted into the body section, the boot comes into contact with the reduced-diameter step section and a rear of the internal space is substantially blocked.

\* \* \* \* \*